UNITED STATES PATENT OFFICE.

THEODORE WANSTRATH, OF NEW POINT, INDIANA.

ENSILAGE-PACKER.

1,308,129. Specification of Letters Patent. Patented July 1, 1919.

Application filed July 12, 1918. Serial No. 244,537.

*To all whom it may concern:*

Be it known that I, THEODORE WANSTRATH, a citizen of the United States, residing at New Point, in the county of Decatur and State of Indiana, have invented a new and useful Ensilage-Packer, of which the following is a specification.

It is the object of my invention to provide a machine for packing the ensilage in a silo mechanically instead of by tramping it down by men's feet. By thus packing it, more even compression is obtained, the ensilage is better preserved, and much disagreeable labor is avoided.

Figure 1:
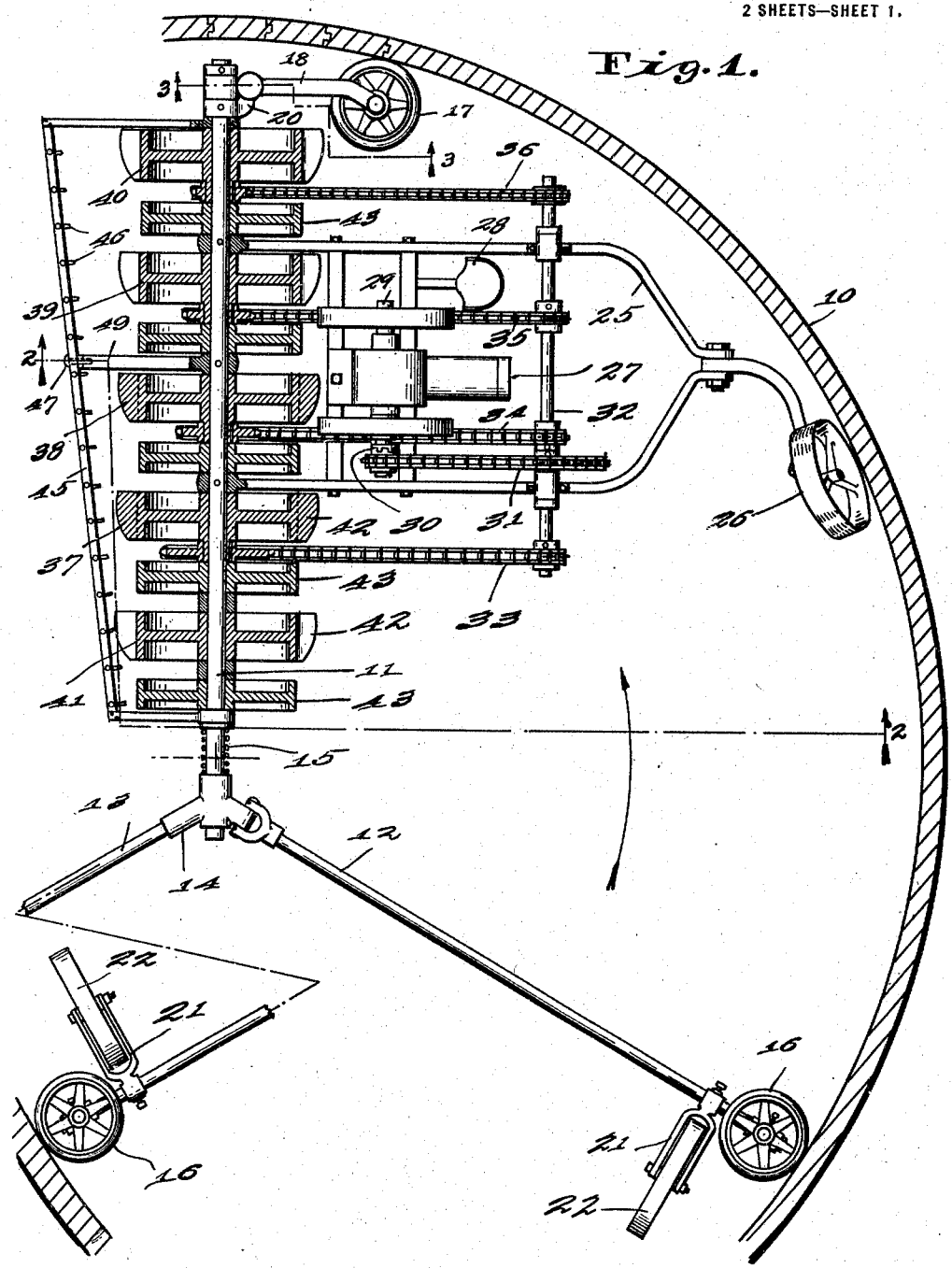
Figure 2:
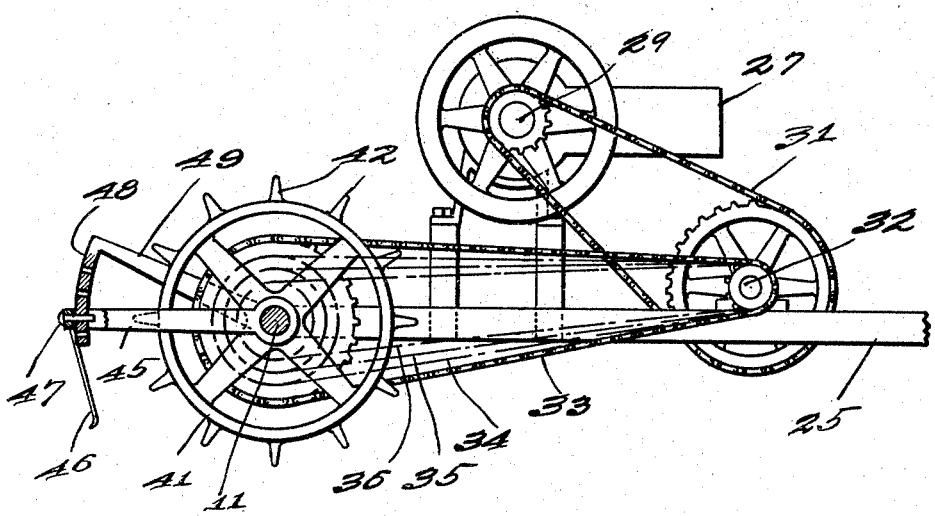
Figure 3:
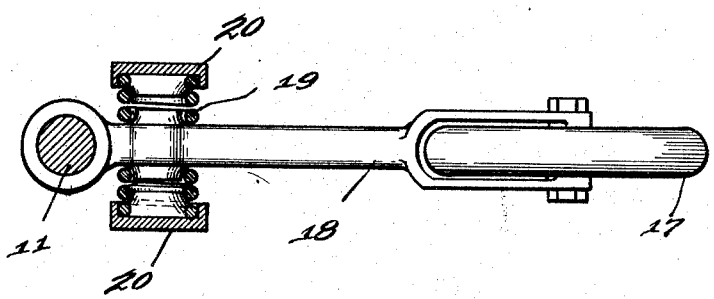

The accompanying drawings illustrate my invention. Figure 1 is a horizontal section through my silo packer, showing also part of the silo; Fig. 2 is a section on the line 2—2 of Fig. 1; and Fig. 3 is a section on the line 3—3 of Fig. 1.

The silo packer operates within the silo 10, into which ensilage is fed in any convenient manner; and may be put into or taken out of such silo through any of the usual openings with which the silo is provided. It has three arms 11, 12, and 13, which are evenly angularly spaced and project from a common meeting point near the center of the silo more or less nearly radially toward the silo wall. These arms constitute the main frame. The arms 12 and 13 at their adjacent ends are mounted on a casting 14, the arm 12 being shown pivotally connected to such casting 14, though this is not essential. The casting 14 is slidably mounted on the inner end of the arm 11, and is spring-pressed along such arm 11 by a compression spring 15, whereby the three arms are forced outward toward the silo wall. A wheel 16 is mounted on a vertical axis on the end of each arm 12 and 13, so as to roll against the inside of the silo wall. A similar wheel 17 is mounted on a vertical axis on a rearwardly extending finger 18 pivoted on the outer end of the arm 11 and centered between two centering springs 19 acting between such finger and the two prongs of a fork 20 fixed on the arm 11. The wheel 17 also engages the inside of the silo wall. Near its outer end, each arm 12 and 13 carries a fork 21 in which is mounted on a substantially horizontal axis a wheel 22 which travels on the surface of the ensilage.

Fixed on and projecting rearwardly from the arm 11 is a frame 25, on the rear end of which is a roller 26 mounted in proper position to travel on the ensilage as the packer rotates within the silo. I prefer to have the roller 26 mounted on an axis which is substantially radial with respect to the silo but is slightly tilted, with its outer end higher, as shown. On the frame 25 is an engine 27, of any convenient type though I prefer an internal combustion engine, and an operator's seat 28. The controlling mechanism for the engine is not shown, since it is of any suitable character. The engine shaft 29 is connected by a clutch 30 and a chain and sprocket connection 31 to a countershaft 32 mounted on the frame 25, and the countershaft 32 in turn is connected by a series of chain and sprocket connections 33, 34, 35, and 36 to a series of drive wheels 37, 38, 39, and 40 rotatably mounted on the arm 11. The chain and sprocket connections 33, 34, 35, and 36 are of different speed ratios, so as to produce different speeds of rotation of the drive wheels 37, 38, 39, and 40 substantially proportionate to the distances of such drive wheels from the center of the silo. These drive wheels, and as many more similar wheels 41 as it may be desired to mount on the arm 11, are all substantially alike, being provided with peripheral teeth 42 for giving them a driving grip on the ensilage; and interspersed among these toothed wheels along the arm 11 are a number of untoothed rollers 43 which simply roll on the surface of the ensilage to compress it.

A raking yoke 45 is pivotally mounted on the arm 11, and projects forward therefrom, and its front cross bar is provided with a number of depending raking teeth 46 for producing proper smoothness of the upper surface of the ensilage. The raking yoke 45 may be adjusted in height by changing the position of a pin 47 carried thereby to any one of a series of holes carried by a fixed sector 48 mounted on a forwardly projecting finger 49 fixed on the arm 11.

When it is desired to fill the silo 10, the silo packer is assembled within such silo in position for operation. Then, as ensilage is fed into the silo in any desired manner, the engine 27 is operated to drive the wheels 37, 38, 39, and 40, thus producing rotation of the packer within the silo. The wheels 16, 17, 22, and 26 guide the movements of the packer; and the drive wheels 37, 38, 39, and 40 and the wheel 41 and rollers 43 pack the ensilage efficiently and evenly as the packer rotates. The pivotal mounting of the finger 18 provides the necessary freedom of movement to accommodate any unevenness in the ensilage surface; but such unevenness is in the main eliminated by the raking teeth 46. As the ensilage is fed in, it is packed by the packer, which rides on the ensilage and gradually rises within the silo as the ensilage is packed beneath it. When the silo is filled to the desired height, the packer may be dismantled and removed through any suitable opening in the silo, usually through the filling opening at the top, and may be reassembled in other silos to operate in them. The packer will operate in various sizes of silos, by changing the position of the casting 14 on the arm 11, and if necessary adding or taking off wheels 41 and rollers 42.

I claim as my invention:

1. A silo packer, comprising an arm, a plurality of drive wheels mounted on said arm, a power device, connections of different speed ratios from said power device to said drive wheels for driving them at different speeds, and a guide arm associated with said first arm, said first arm and said guide arm being adapted to coöperate with the silo wall to guide the movements of the packer.

2. A silo packer, comprising a plurality of radiating arms adapted to have guiding connection with the silo wall, a plurality of drive wheels mounted on one of said arms, a frame connected to said arm, an engine carried by said frame, and driving connections from said engine to said drive wheels, said driving connections having different speed ratios.

3. A silo packer, comprising a plurality of radiating arms adapted to have guiding connection with the silo wall, a plurality of drive wheels mounted on one of said arms, a frame connected to said arm, an engine carried by said frame, driving connections from said engine to said drive wheels, said driving connections having different speed ratios, and a plurality of other wheels interspersed among said drive wheels on the arm which carries them.

4. A silo packer, comprising an arm, drive wheels mounted thereon, a power device connected with said wheels for driving them, a member mounted on the inner end of said arm and spring-pressed therealong, and guide arms mounted on said member and projecting toward the silo wall, said first arm and said guide arms being adapted to have guiding connection with the inside of the silo wall.

5. A silo packer, comprising a frame adapted to have guiding connection with the inside of the silo wall, drive wheels mounted on said frame, an engine associated with said frame and having driving connections of different speed ratios with said wheels, and a raking frame carried by that frame and having raking teeth preceding the driving wheels.

6. A silo packer, comprising a plurality of radiating arms, a drive wheel mounted on one of said arms, a power device associated with said drive wheel for driving it, a rearwardly projecting finger from the outer end of said arm, a guide roller carried by said finger for engaging the inside of the silo wall, centering springs for positioning said rearwardly projecting finger, and guide rollers carried by the other arms for engaging the inside of the silo wall.

7. A silo packer, comprising a plurality of radiating arms adapted to have guiding connection with the inside of the silo wall, carrying wheels on said arms for traveling on the surface of the ensilage, a frame mounted on one of said arms, said frame having a wheel for traveling on the surface of the ensilage so that said frame is supported by said wheel and said arm, a power device on said frame, and a connection from said power device to a wheel on the arm on which said frame is mounted.

8. A silo packer, comprising a frame, adapted to have guiding connections with the inside of the silo wall, a plurality of drive wheels mounted on said frame, a power device, connections of different speed ratios from said power device to said drive wheels for driving said drive wheels at different speeds, and a plurality of rollers interspersed among said drive wheels.

In witness whereof I have hereunto set my hand at Clarksburg, Indiana, this 9th day of July, A. D. one thousand nine hundred and eighteen.

THEODORE WANSTRATH.

Copies of this patent may be obtained for five cents each, by addressing the "Commissioner of Patents, Washington, D. C."